United States Patent
Norman et al.

(10) Patent No.: US 8,286,882 B2
(45) Date of Patent: Oct. 16, 2012

(54) EYEGLASSES TAG WITH HOOK

(75) Inventors: Michael Norman, East Brunswick, NJ (US); Keith C. Cedro, Clifton, NJ (US)

(73) Assignee: B&G Plastics, Inc., Newark, NJ (US)

( * ) Notice: Subject to any disclaimer, the term of this patent is extended or adjusted under 35 U.S.C. 154(b) by 0 days.

(21) Appl. No.: 13/215,406

(22) Filed: Aug. 23, 2011

(65) Prior Publication Data

US 2012/0048944 A1    Mar. 1, 2012

Related U.S. Application Data

(60) Provisional application No. 61/376,941, filed on Aug. 25, 2010.

(51) Int. Cl.
*A47F 5/00* (2006.01)

(52) U.S. Cl. .......... 235/487; 223/85; 248/315; 351/155; 206/5

(58) Field of Classification Search .................. 235/487; 223/85; 248/309.1, 315, 316.7; 351/155; 206/5
See application file for complete search history.

(56) References Cited

U.S. PATENT DOCUMENTS

| | | | |
|---|---|---|---|
| 2,016,059 A | 10/1934 | Stevens | |
| 3,429,065 A | 2/1969 | Long et al. | |
| 3,561,074 A | 2/1971 | Mosher, Jr. et al. | |
| 3,738,034 A | 6/1973 | Seaver | |
| D234,473 S | 3/1975 | Ringle | |
| D308,080 S | 5/1990 | Sachs | |
| 4,976,532 A | 12/1990 | Nyman | |
| 5,046,696 A | 9/1991 | Lee | |
| 5,129,617 A | 7/1992 | MacWilliamson | |
| 5,340,074 A | 8/1994 | Porcaro et al. | |
| 5,437,172 A | 8/1995 | Lamy et al. | |
| 5,484,056 A | 1/1996 | Wood | |
| 5,504,541 A | 4/1996 | Kolton et al. | |
| 5,559,567 A | 9/1996 | Kolton et al. | |
| 5,743,403 A | 4/1998 | Crysdale | |
| 5,857,597 A | 1/1999 | Kolton | |
| 5,988,462 A | 11/1999 | Kolton | |
| 6,264,077 B1 | 7/2001 | Kolton et al. | |
| 6,433,686 B1 | 8/2002 | Feibelman | |
| 6,637,591 B2 | 10/2003 | Chen | |
| 6,724,311 B1 | 4/2004 | Kolton et al. | |
| 6,827,210 B2 | 12/2004 | Chen | |
| 7,143,892 B2 | 12/2006 | Kolton et al. | |
| 7,183,914 B2 | 2/2007 | Norman et al. | |
| 7,331,554 B2 | 2/2008 | Cheng | |
| 7,448,520 B2 | 11/2008 | Kolton et al. | |
| 7,456,741 B2 | 11/2008 | Norman et al. | |
| 7,556,232 B1 | 7/2009 | Begg | |
| 2012/0026453 A1 * | 2/2012 | Norman et al. | 351/155 |

* cited by examiner

*Primary Examiner* — Daniel Hess
(74) *Attorney, Agent, or Firm* — Hoffmann & Baron, LLP

(57) ABSTRACT

A tag with a hook for securing a tag to a pair of eyeglasses having a frame and two hinged legs is provided. The eyeglasses tag includes a body, a foldable member, a hook, an adhesive area and, optionally, a bend line, a panel with identification information, an adhesive portion, a radio frequency identification (REID) device or electronic article surveillance (EAS) device and an aperture. An adhesive strip of the foldable member is foldably attached to the first leg of the eyeglasses and the first and second sections of the body are folded together and affixed by the adhesive area so that the first leg of the eyeglasses is disposed between the first and second sections of the body. The eyeglasses tag can include an adhesive portion on the front side of the tag for affixing the panel with identification information, the radio frequency identification (RFID) device or the electronic article surveillance (EAS) device secured to the body.

20 Claims, 4 Drawing Sheets

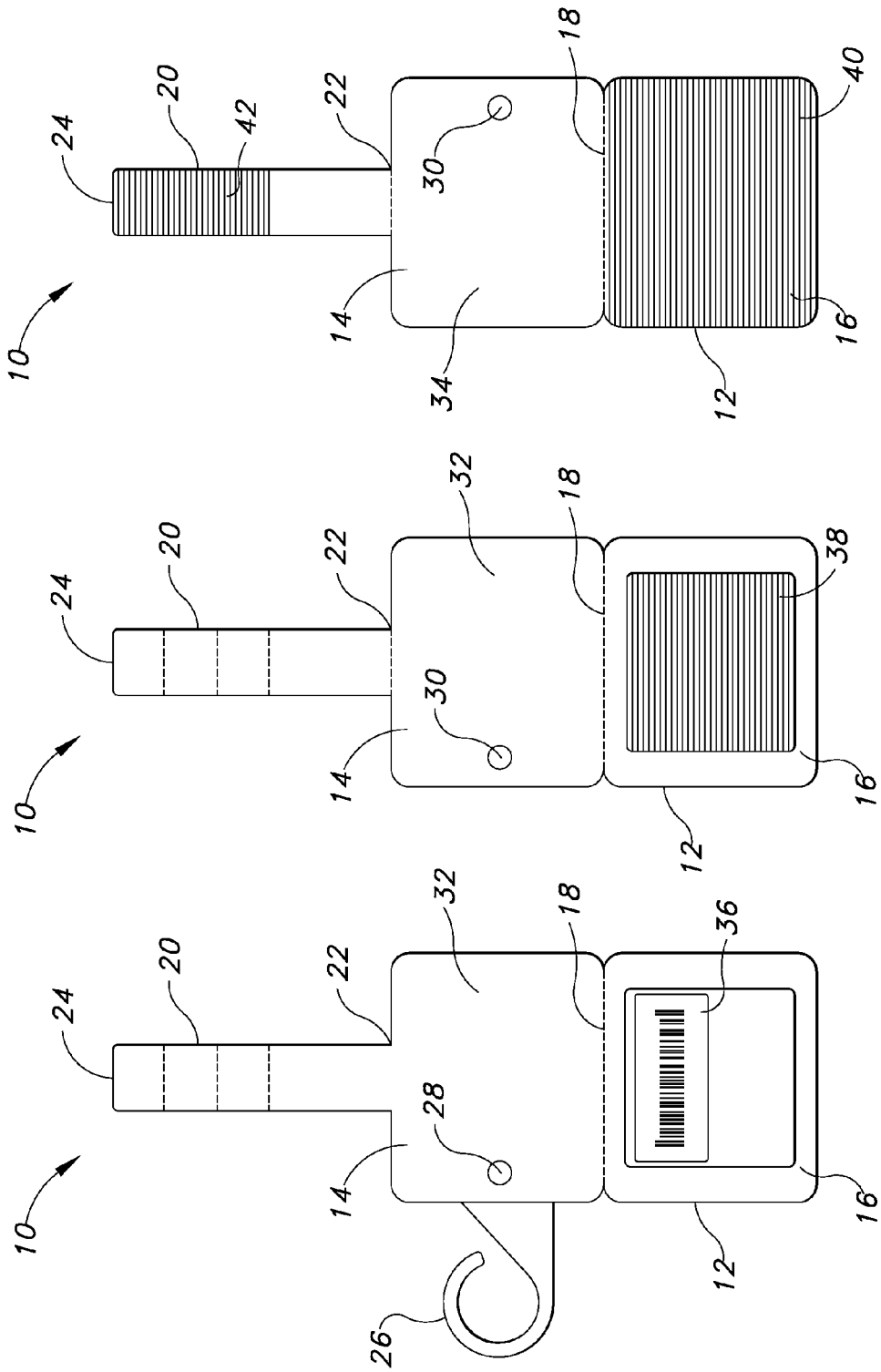

EYEGLASSES TAG WITH HOOK

This application claims priority from provisional application Ser. No. 61/376,941, filed on Aug. 25, 2010, which is incorporated herein in its entirety.

FIELD OF THE INVENTION

The present invention relates to tags that are used in the packaging and display of merchandise. In particular, the present invention relates to tags that are secured to eyeglasses and hung from merchandise displays.

BACKGROUND OF INVENTION

Small articles are commonly displayed for sale in retail stores on racks or in display cases where the articles are hung. A variety of different packages and tags have been used that are secured to the article and have a means for attaching the article to the rack for display. Several of the criteria for designing these tags relate to the cost of manufacturing the tags and the cost of attaching them to the articles. Another important design consideration is that the tags must be convenient for the merchant to display and they must be convenient for the customer to remove after purchase.

Tags used for displaying eyeglasses must be designed so that the customer can easily view the eyeglasses and remove them from the display rack. The tags must also be designed so that the customer can easily try on a pair of eyeglasses without having to remove the tag. Because a customer may try on several pairs of eyeglasses before making a selection, the tags must be designed so that they can be removed and then reinstalled on the rack by the customer numerous times without damaging either the eyeglasses or the tags.

Tags often include radio frequency identification (RFID) devices or electronic article surveillance (EAS) devices. Electronic tags attached to articles have a wide variety of uses, including tracking, inventory control and security. These electronic tags can also provide electronically readable information pertaining to the articles. EAS tags may be used with an alarm system to provide theft deterrence by monitoring the location of the tags and any unauthorized movement of the article containing the EAS tag from a predetermined area. The tags can be enclosed in or attached to a variety of different devices, such as holders or housings, which accommodate the electronic tag and are used to attach the tags to articles. The tags are secured to the article so that they remain with the article until after the time of purchase.

Accordingly, there is a need for a tag for displaying eyeglasses that can be easily removed and reinstalled in the display and that does not prevent the eyeglasses from being worn by a customer. There is also a need for a tag for displaying eyeglasses that can be economically manufactured and easily and firmly secured to the eyeglasses.

SUMMARY OF THE INVENTION

In accordance with the present invention, a tag with a hook for securing a tag to a pair of eyeglasses having a frame and two hinged legs is provided. The eyeglasses tag includes a body, a foldable member, a hook, an adhesive area and, optionally, a bend line, a panel with identification information, an adhesive portion, a radio frequency identification (RFID) device or electronic article surveillance (EAS) device and an aperture. The body is preferably substantially flat and includes a first section foldably connected to a second section, a front side and a back side. The bend line can be disposed between the first section and the second section.

The foldable member can be substantially coplanar with the body and can extend from the first section of the body opposite the second section. The foldable member includes an adhesive strip and can have one or more bend lines. The hook is connected to the body, preferably to the first section of the body, by a fastener and an aperture in the first section of the body. Preferably, the hook is pivotably connected to and extends away from the body.

The eyeglasses tag can include an adhesive portion on the front side of the tag for affixing the panel with identification information, the radio frequency identification (RFD) device or the electronic article surveillance (EAS) device secured to the body. The adhesive area can be located on the back side of at least the first or second section and can be used to affix the first and second sections together.

The adhesive strip of the foldable member foldably attaches to the first leg of the eyeglasses and the first and second sections of the body are folded together and secured by the adhesive area so that the first leg of the eyeglasses is disposed between the first and second sections of the body.

BRIEF DESCRIPTION OF THE FIGURES

The preferred embodiments of the eyeglasses tag with hook of the present invention, as well as other objects, features and advantages of this invention, will be apparent from the accompanying drawings wherein:

FIG. 1 is a plan view of the front side of a preferred embodiment of the eyeglasses tag of the present invention with an information panel attached.

FIG. 2 is a plan view of the front side of the eyeglasses tag shown in FIG. 1 with an adhesive portion.

FIG. 3 is a plan view of the back side of the eyeglasses tag shown in FIG. 1.

DETAILED DESCRIPTION OF THE INVENTION

Figure 4:
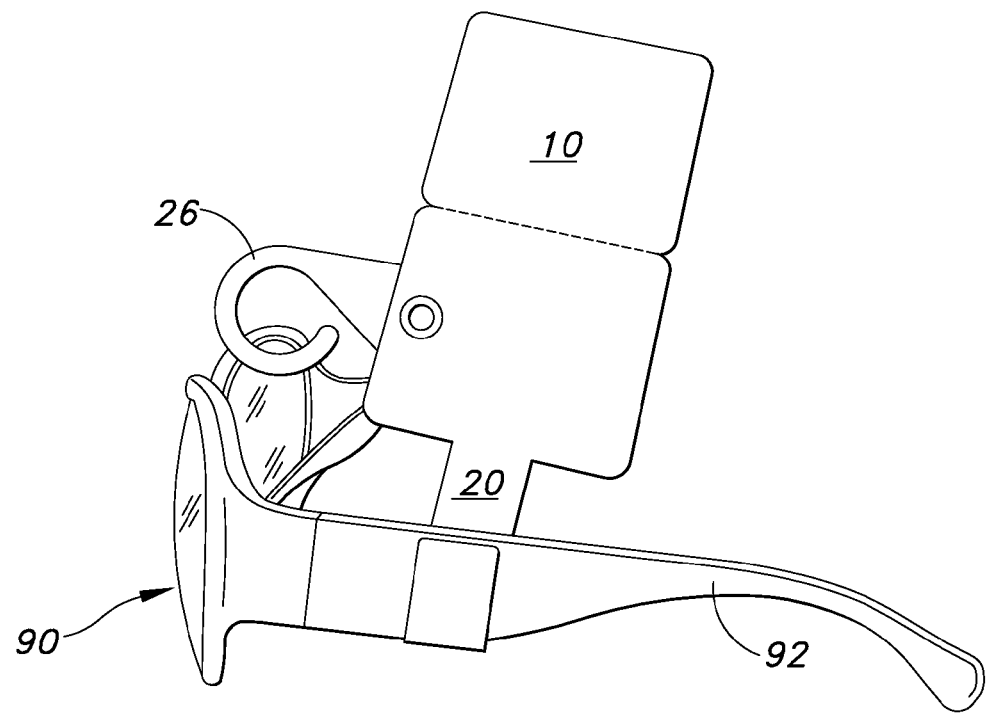
FIG. 4 shows the eyeglasses tag of FIG. 1 with the distal end of the foldable member attached to one of the legs of a pair of eyeglasses.

The present invention is an eyeglasses tag with a hook that is attached to a pair of eyeglasses having a frame and first and second hinged legs. The eyeglasses tag has a body with first and second sections and a foldable member extending from the first section. An adhesive strip on the foldable member is used to attach the eyeglasses tag to a pair of eyeglasses, preferably to one of the legs, and an adhesive area on one of the sections of the body secures the two sections together. A hook is pivotably attached to one of the sections of the body and, preferably, extends from the side of one of the sections at a right angle to the foldable member. The hook is used for hanging the eyeglasses tag from a display after the tag is secured to the eyeglasses. The tag is preferably made form a plastic material. However, other materials can be used, such as paper, cardboard and/or laminates, without limiting the scope of the invention in any way.

Turning now to the figures, FIGS. 1-3 show the eyeglasses tag 10 of the present invention, which has a body 12 that includes a first section 14 foldably connected to a second section 16 and separated by a bend line 18. A foldable member 20 extends from a base 22, which is attached to the side of the first section 14 opposite the second section 16, to a distal end 24. A hook 26 is pivotably attached to the body 12 with a fastener 28 located in an aperture 30 in the first section 14. The hook 26 extends from the side of the body 12 that is substantially perpendicular to the foldable member 20. FIGS. 1 and 2 show the front side of the tag 10 and FIG. 3 shows the back side 34 of the tag 10.

FIG. 1 shows a panel 36 with identification information on the front side 32 of the second section of the tag 10, while FIG. 2 shows the adhesive portion 38 that is used to secure the panel 36 to the tag 10. The adhesive portion 38 can also be used to secure an RFID or EAS device to the tag 10. In addition, FIG. 2 shows the aperture 30 that is used to attach the hook 26 to the body 12 of the tag 10.

FIG. 3 shows the back side 34 of the tag 10 and an adhesive area 40 on the second section 16 of the body 12 and an adhesive strip 42 on the foldable member 20. After the foldable member 38 is attached to a pair of eyeglasses 90 using the adhesive strip 42, the body 12 is folded along fold line 18 and the adhesive area 40 secures the first section 14 to the second section 16.

Figure 5:
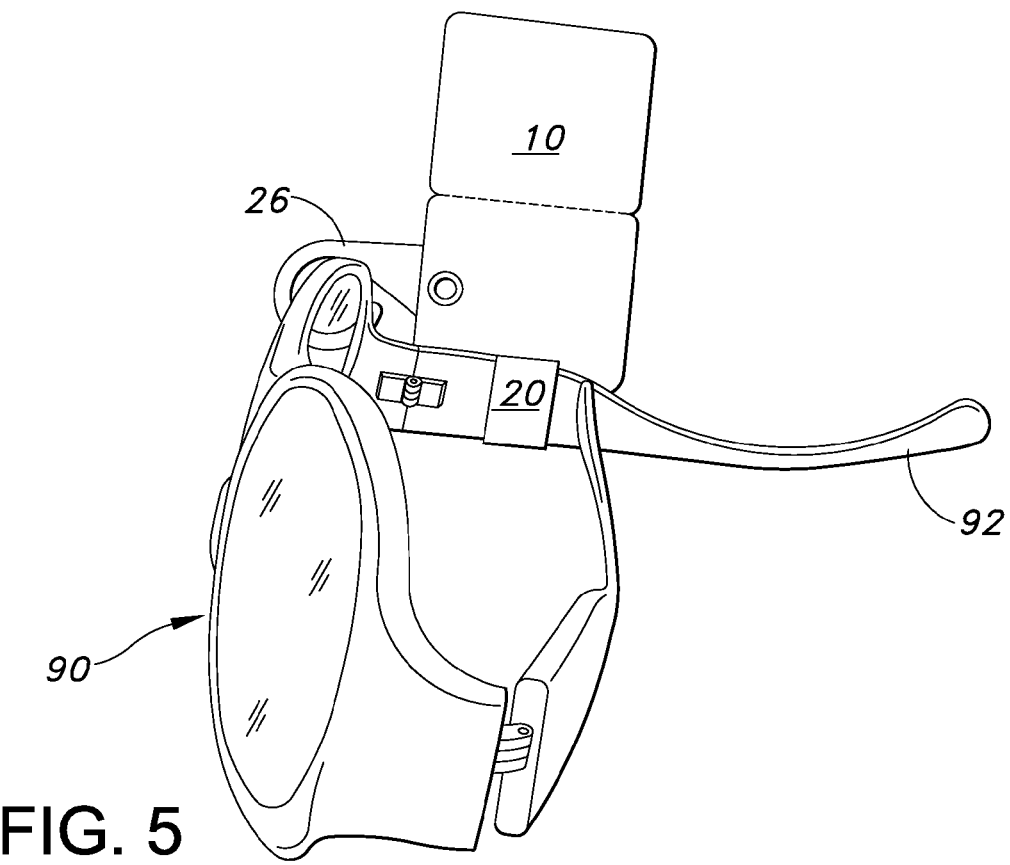
FIG. 5 shows the eyeglasses tag of in FIG. 1 with the foldable member partially wrapped around one of the legs of a pair of eyeglasses.
Figure 6:
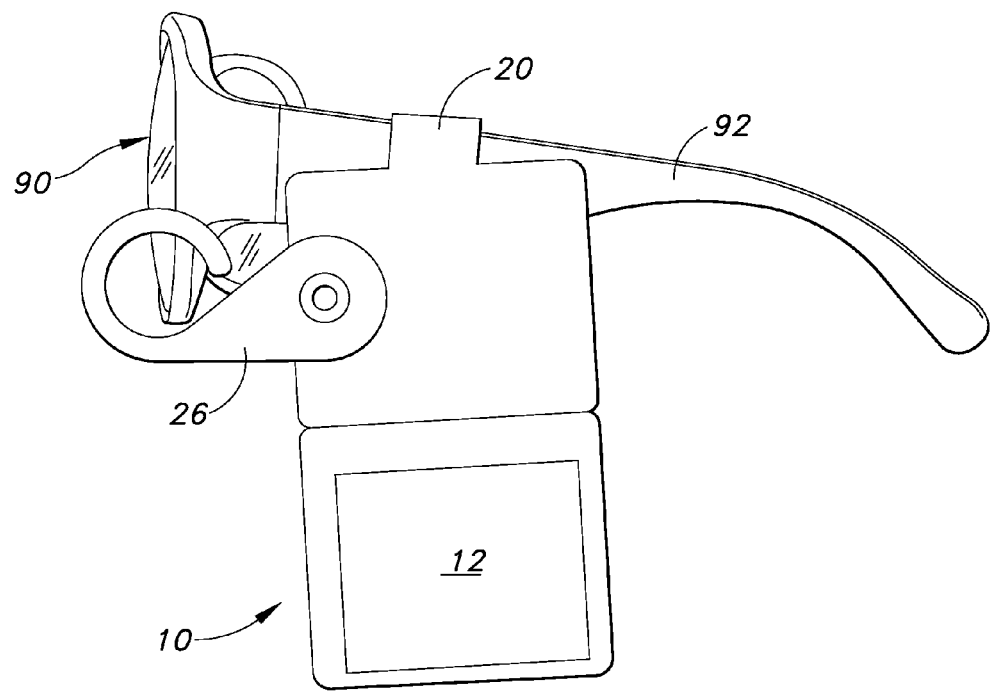
FIG. 6 shows the eyeglasses tag of FIG. 1 with the foldable member wrapped around one of the legs of a pair of eyeglasses.
Figure 7:
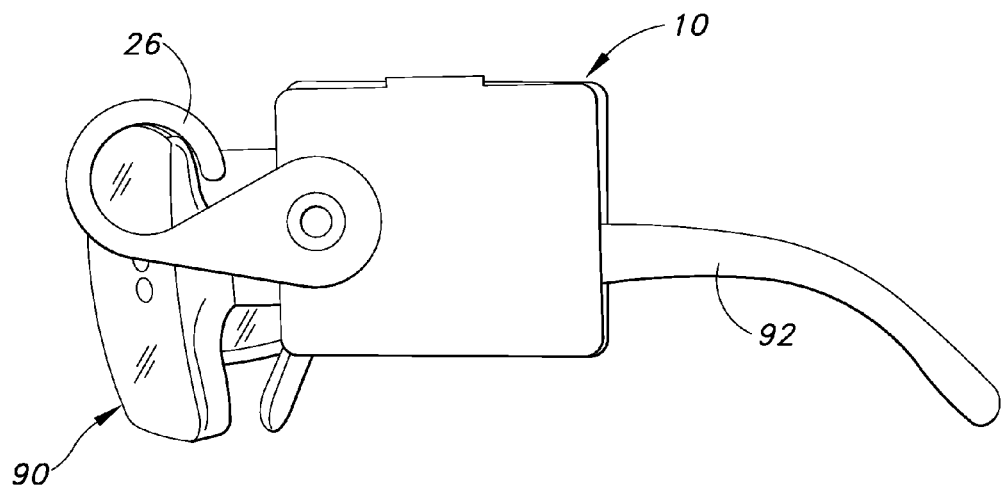
FIG. 7 shows the eyeglasses tag of FIG. 1 with the foldable member wrapped around one of the legs of a pair of eyeglasses and the body of the tag folded over.

FIG. 4 illustrates how the tag 10 is attached to the leg 92 of a pair of eyeglasses 90. The foldable member 20 is wrapped around the leg 92 with the adhesive strip 42 contacting the leg 92 to secure the tag 10. FIG. 5 shows the tag 10 after the foldable member 20 is wrapped around the leg 92. FIG. 6 shows the tag 10 with the foldable member 20 attached to the leg 20 and the body 12 of the tag 10 in an unfolded configuration. FIG. 7 shows the tag 10 after it is installed on the leg 12. The first section 14 is folded over and attached to the second section 16 of the body 12 with the leg 92 of the eyeglasses 90 disposed between the first and second sections 14, 16, respectively.

Figure 8:
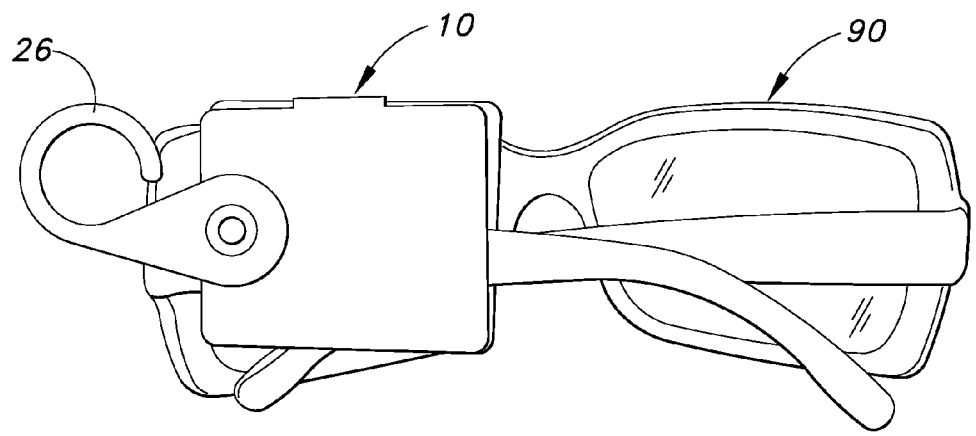
FIG. 8 shows the back side of a pair of eyeglasses with the eyeglasses tag of FIG. 1 attached to one of the legs.
Figure 9:
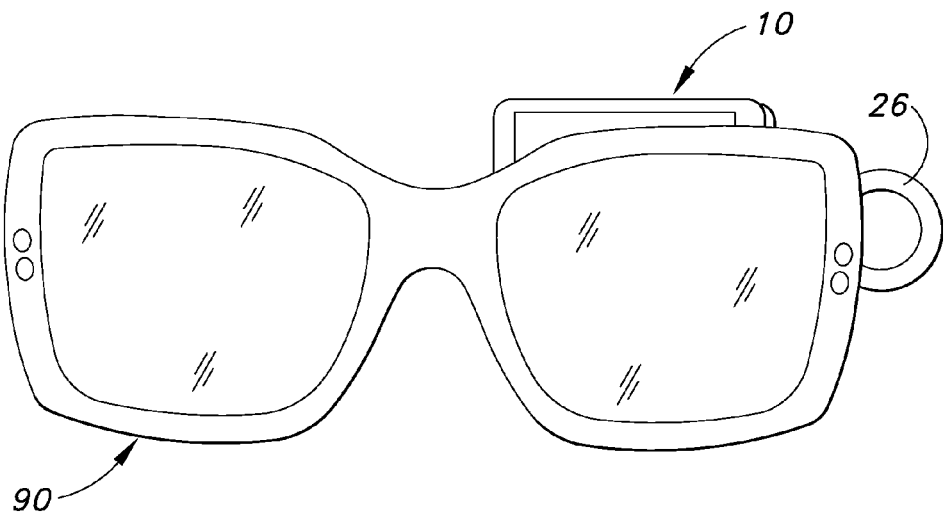
FIG. 9 shows the front side of a pair of eyeglasses with the eyeglasses tag of FIG. 1 attached to one of the legs.

FIGS. 8 and 9 show the tag 10 after it is attached to the leg 92 of a pair of eyeglasses 90. When the legs 92 are folded, the hook 26 extends beyond the end of the eyeglasses 90 so that the eyeglasses 90 can conveniently be hung in a display rack (not shown). FIG. 9 shows the front of the eyeglasses 90 with the tag 10 attached to the leg 92 positioned behind the frame. The tag 10 is attached to the eyeglasses 90 so that a customer can easily view the eyeglasses 90 and try them on without removing the tag 10.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An eyeglasses tag with a hook for attachment to a pair of eyeglasses having a frame and first and second hinged legs, the eyeglasses tag comprising:
    a body comprising a first section foldably connected to a second section, a front side and a back side;
    a foldable member extending from the first section of the body opposite the second section and comprising an adhesive strip;
    a hook connected to the body; and
    an adhesive area on the body,
    wherein the adhesive strip of the foldable member is foldably attached to the first leg of the eyeglasses and the first and second sections of the body are folded together and affixed by the adhesive area.

2. The eyeglasses tag according to claim 1, wherein the body is substantially flat.

3. The eyeglasses tag according to claim 1, further comprising a bend line between the first section and the second section.

4. The eyeglasses tag according to claim 1, wherein the foldable member is substantially coplanar with the body.

5. The eyeglasses tag according to claim 1, wherein the hook is connected to the first section of the body.

6. The eyeglasses tag according to claim 1, wherein the first leg of the eyeglasses is disposed between the first and second sections of the body.

7. The eyeglasses tag according to claim 1, wherein the foldable member has one or more bend lines.

8. The eyeglasses tag according to claim 1 further comprising a panel with identification information on the front side of the body.

9. The eyeglasses tag according to claim 1 further comprising an adhesive portion affixed to the front side of the body.

10. The eyeglasses tag according to claim 9 further comprising a radio frequency identification (RFID) device or electronic article surveillance (EAS) device secured to the body by the adhesive portion.

11. The eyeglasses tag according to claim 1, wherein the back side of at least the first or second section has an adhesive area.

12. The eyeglasses tag according to claim 1, further comprising an aperture in the first section of the body that is used to attach the hook to the body.

13. The eyeglasses tag according to claim 1, wherein the hook is pivotably connected to and extends away from the body.

14. An eyeglasses tag with a hook for attachment to a pair of eyeglasses having a frame and first and second hinged legs, the eyeglasses tag comprising:
    a substantially flat body comprising a first section foldably connected to a second section, a front side and a back side;
    a bend line between the first section and the second section;
    a foldable member substantially coplanar with the body and extending from the first section of the body opposite the second section and comprising an adhesive strip and one or more bend lines;
    a panel with identification information on the front side of the body;
    an adhesive portion on the front side of the body;
    a hook connected to the first section of the body, wherein the hook is pivotably connected to and extends away from the body; and
    an adhesive area on the body,
    wherein the adhesive strip of the foldable member foldably attaches to the first leg of the eyeglasses and the first and second sections of the body are folded together and affixed by the adhesive area.

15. The eyeglasses tag according to claim 14, wherein the first leg of the eyeglasses is disposed between the first and second sections of the body.

16. The eyeglasses tag according to claim 14, further comprising a radio frequency identification (RFID) device or electronic article surveillance (EAS) device secured to the body by the adhesive portion.

17. The eyeglasses tag according to claim 14, wherein the adhesive area is located on the back side of at least the first or second section.

18. The eyeglasses tag according to claim 14, further comprising an aperture in the first section of the body that is used to attach the hook to the body.

19. An eyeglasses tag with a hook for attachment to a pair of eyeglasses having a frame and first and second hinged legs, the eyeglasses tag comprising:
- a substantially flat body comprising a first section foldably connected to a second section, a front side and a back side;
- a bend line between the first section and the second section;
- a foldable member substantially coplanar with the body and extending from the first section of the body opposite the second section and comprising an adhesive strip and one or more bend lines;
- a panel with identification information on the front side of the tag;
- an aperture in the first section of the body that is used to attach the hook to the body;
- a hook attached to the body using a fastener and an aperture in the first section, wherein the hook is pivotably connected to and extends away from the body; and
- an adhesive area on at least the first or second section of the, wherein the adhesive strip of the foldable member foldably attaches to the first leg of the eyeglasses and the first and second sections of the body are folded together and affixed by the adhesive area, and wherein the first leg of the eyeglasses is disposed between the first and second sections of the body.

20. The eyeglasses tag according to claim 19 further comprising a radio frequency identification (RFID) device or electronic article surveillance (EAS) device secured to the body by the adhesive portion.

* * * * *